United States Patent [19]

Bump, Jr. et al.

[11] Patent Number: 5,398,437
[45] Date of Patent: Mar. 21, 1995

[54] WARNING DEVICE FOR VEHICLES AND THE LIKE

[76] Inventors: Elmer R. Bump, Jr.; Gregory J. Bump, both of 225 Fenwick Ave., Wilmington, Del. 19804; Beverly A. Stahlberger; Joseph W. Biggs, both of 40 Pineview Ter., Bridgeton, N.J. 08302

[21] Appl. No.: 40,205
[22] Filed: Apr. 1, 1993
[51] Int. Cl.6 .................. G09F 13/16; G09F 21/04
[52] U.S. Cl. ................................ 40/582; 40/591; 40/600; 40/603; 40/604; 116/28 R; 116/173
[58] Field of Search ............... 40/582, 591, 592, 600, 40/603, 604; 116/28 R, 173

[56] References Cited

U.S. PATENT DOCUMENTS

| | | | |
|---|---|---|---|
| 2,957,261 | 10/1960 | Moskowitz | 40/591 |
| 3,255,725 | 6/1966 | Von Kreidner et al. | 116/173 |
| 3,670,438 | 6/1972 | Carroll et al. | 40/591 |
| 3,672,323 | 6/1972 | Hawes | 40/591 |
| 3,701,210 | 10/1972 | Smith | 40/591 |
| 3,763,585 | 10/1973 | Mosch | 40/604 |
| 3,975,849 | 8/1976 | Tuleja | 40/611 |
| 4,021,948 | 5/1977 | Mosch | 40/591 |
| 4,044,482 | 8/1977 | Mosch | 40/582 |
| 4,178,874 | 12/1979 | Berns et al. | 116/28 R |
| 4,821,668 | 4/1989 | Leschke et al. | 40/582 |
| 5,016,372 | 5/1991 | Gold | 40/604 |
| 5,076,196 | 12/1991 | Chan | 40/591 |
| 5,156,274 | 10/1992 | Williams, Jr. et al. | 40/600 |
| 5,224,439 | 7/1993 | O'Connell et al. | 40/591 |
| 5,226,792 | 7/1993 | Darago | 40/600 |
| 5,255,464 | 10/1993 | Marecek | 40/591 |

FOREIGN PATENT DOCUMENTS

| | | | |
|---|---|---|---|
| 1803503 | 5/1970 | Germany | 40/591 |
| 2255589 | 5/1973 | Germany | 40/591 |
| 2231997 | 11/1990 | United Kingdom | 40/591 |

Primary Examiner—Richard A. Bertsch
Assistant Examiner—Howard R. Richman
Attorney, Agent, or Firm—Connolly and Hutz

[57] ABSTRACT

The present invention relates to a warning device for vehicles that are stopped whereby there may be danger of collision with another moving vehicle and danger of personal injury of such a moving vehicle. The present invention relates to a safety banner device for use in combination with a vehicle or the elements of nature. The safety banner device according to this invention would contain:
a) foldable material;
b) at least one magnet embedded in the light weight material thereby allowing the material to be affixed to a metal surface;
c) at least one warning symbol made of a reflective material whereby being visible to people when lights would shine on the banner, and wherein
d) the banner is capable of being folded up several times or rolled up whereby it is capable of being stored into a small container.

22 Claims, 1 Drawing Sheet

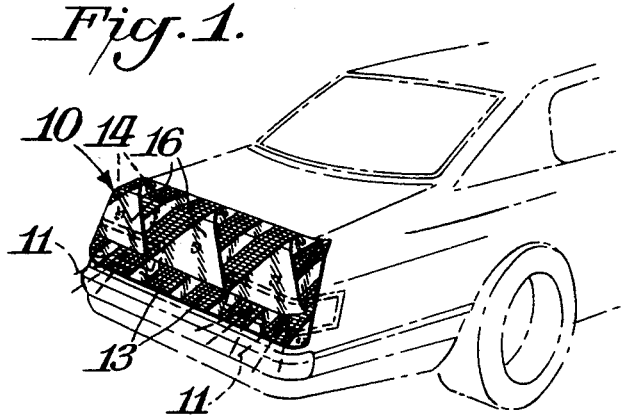
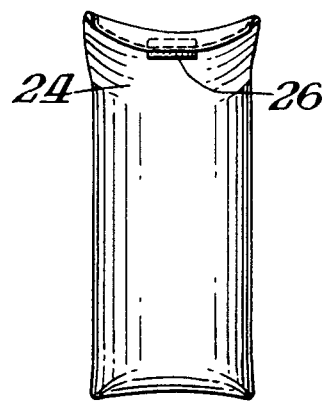
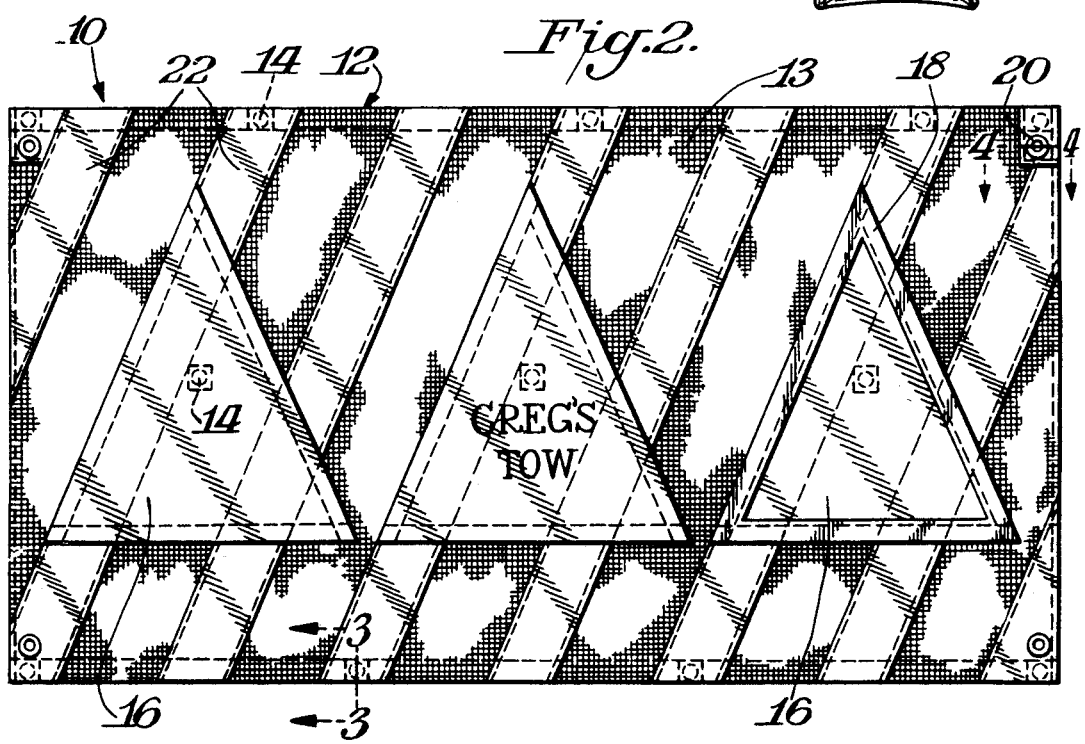
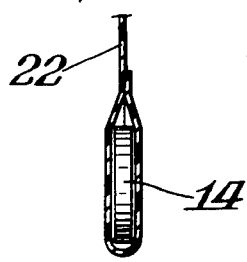
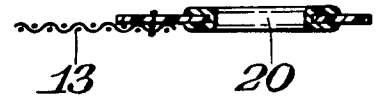

WARNING DEVICE FOR VEHICLES AND THE LIKE

The present invention relates to a warning device that can be magnetically attached to a vehicle and the like.

BACKGROUND OF THE INVENTION

Signs for vehicles an the like have been known for many years. U.S. Pat. No. 2,957,261 issued to Moskowitz in 1958 discloses the use of magnetic signs for vehicles. The signs are made of molded plastic dyecasting or can be fabricated from sheet metal, wood or the like and is made of non-magnetic material. The problem with these signs is that they are very heavy, big, bulking, not foldable and not convenient to install. These signs appear to be used for advertising and were not warning signs.

There are known electrical warning devices on motor vehicles. An example which is an emergency light flasher which are attached to the lower portion of a vehicle. However, not all vehicles have emergency light flashers. A disadvantage of this type of warning device is that it is not seen in the day time and it can be readily obstructed by a person standing on the road or around the vehicle. When an automobile becomes disabled on or adjacent to a roadway, a substantial danger is present. It is well known that such a stationary, disabled vehicle constitutes a serious hazard to the safety to the passenger as well as to approaching vehicles. This problem is exacerbated if for any reason the flashing hazard lights do not work or have not been installed on such vehicle. Various products have been designed to addressed the aforementioned problem, for example, U.S. Pat. No. 4,044,482 to Mosch. One of the problems with the structures disclosed in Mosch is that the trunk of the automobile must be open in an open position when they are used. One problem with this arrangement is that the automobile may need to be left unattended and the other things in the trunk which could be stolen under these circumstances. Furthermore, an open trunk would also permit a perspective thief to gain easy access to the interior of the automobile by pushing back the seat. Also, the rods, fasteners, and roller arrangements disclosed in Mosch make them bulky and expensive. Another problem with Mosch is that if the automobile is in an accident and the trunk is damaged, one may not be able to open the trunk to show the sign.

Another patent, U.S. Pat. No. 5,076,196 to Chan describes a traffic warning mat apparatus is provided for the use in combination with the vehicle of the type having a trunk lid pivotally attached to the vehicle. The mat is adapted to be disposed on the rear of the automobile. The straps are connected between the top mat and the gutter hook which extends around the front end of the trunk. The straps are attached to the bottom of the mat and have gutter hooks thereon for attachment to the underside of the vehicle or to the bottom of the bumper. Each of the four mentioned straps include mechanisms for tightening the straps for securing the mat on the rear of the automobile when in use. A problem with Chan is that if the rear of the automobile is damaged, it would be very hard, if not impossible to attach the warning mat to the automobile. In addition, for a child or someone who had just gotten in an accident, it may be very hard to attach the warning mat. Consequently, there is a need for a warning device which will overcome the aforementioned problems of the prior art. Disclosed is the invention.

SUMMARY OF THE INVENTION

The present invention relates to a warning device for vehicles that are stopped whereby there may be danger of collision with another moving vehicle and danger of personal injury of such a moving vehicle to a person attempting to repair the stopped vehicle. The present invention relates to a safety banner device for use in combination with a vehicle or used in combination with the elements of nature (i.e. staked in the ground so an overhead search group at night can spot the desired location).

A vehicle according to this application is defined to mean any motorized or non-motorized apparatus. The motorized vehicles can be, but are not limited to automobiles, farm equipment, trailers, campers, street vendor's vehicles, boats, buses, trucks, motorcycles, mopeds or the like. Non-motorized vehicles can be apparatus such as sailboats, or equipment at constructions sites. The safety banner would be capable of being attached to any part of the vehicle by magnets.

It is, accordingly, an object of this invention to overcome the disadvantages and defects in the prior art and more particularly, it is an object to provide a safety banner which is simple in construction, economical to manufacture and simple and efficient to use.

Another object of the invention is to provide a safety banner for the use on vehicles having an improved means thereon for preventing the sign from slipping.

Another object of the invention is to provide an improved magnetic means for attaching a safety banner.

Another object of the present invention is to provide an improved traffic warning device.

Another object of the present invention is to provide an improved traffic warning device which can be connected to any part of the vehicle and it would not be limited to the rear of the vehicle.

A further object of the present invention is to provide a traffic warning device of the aforementioned type which is compact and inexpensive to produce.

A still further object of the present invention is to provide an improved traffic warning device which permits fast and easy installation by any person of any age.

A still further object of the present invention is to provide a traffic warning device which does not require the user to open rear windows or the trunk in order to utilize the device and thereby discourages theft of articles in vehicles and discourages the theft of the vehicle itself.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view showing the safety banner attached to a vehicle trunk;

FIG. 2 is a top plan view of the vehicle cover shown in FIG. 1;

FIG. 3 is a cross-sectional view taken along the line 3—3 of FIG. 2, showing the attachment magnet for the safety banner;

FIG. 4 is a cross-sectional view taken along the line 4—4 of FIG. 1, showing the attachment grommet for the safety banner;

FIG. 5 is a fragmental plan view showing an alternate construction for a safety banner; and FIG. 6 is a top plan view of a storage containing for the safety banner shown in FIGS. 1-5.

DESCRIPTION OF THE PREFERRED EMBODIMENTS

Referring now to the drawings, wherein like reference numerals designate identical or corresponding parts throughout the several views, FIG. 1 shows the safety banner device 10 attached to a vehicle such as a car. The safety banner device 10 can be mounted over the rear of the car and allow oncoming cars to see the flashers 11 through the banner material 12. The banner device 10 can cover any metallic area of a vehicle, such as, but not limited to the front, sides, top, bottom, rear, or trunk whether open or closed.

FIG. 2 shows the details of the safety banner device 10. The safety banner device 10 could be made of at least one piece of banner material 12. The shape of the banner 12 could be circular, square, rectangular or any other shape known. However, it is preferably rectangular. The banner 12 could be made of a light-weight, foldable, creasable material, preferably water-proof, fire or heat resistant and/or wind resistant. The material could be any known non-reflective material such as nylon or cotton material and/or the material can have a mesh structure 13 which could allow the wind to travel through the material. It would be preferable that a nylon mesh 13 would be used because it would be lighter and it would allow the wind and the rain to pass through. Materials such as cotton could be used but it would not be the preferably material due to the fact the moisture such as rain or snow may saturate the material causing the banner to get wet and heavy.

Permanent magnets 14 would be attached to the banner 12. There would be at least one permanent magnet 14. The magnet 14 could be any commercially available magnet. Preferably the magnets 14 would have a flat surface on the bottom thereby allowing the magnet to have a bigger surface to adhere to the vehicle. Preferably, there would be at least one magnet 14 in each of the four corners. More preferably there would be a magnet 14 in the four corners and a series of magnets 14 outlining the perimeter of the structure and optionally a magnet 14 under each of the safety symbols 16. Most preferably there would be a series of magnets 14 outlining the perimeter of the structure and additionally in the center of the back of each symbol 16. Also mounted to the material would be at least one safety symbol 16 and preferably about three symbols. The safety symbols 16 could be of any recognizable shape known internationally or in the United States. FIG. 2 shows triangles being used in order to warn people that the vehicle is in distress. The symbols 16 are attached to the banner 12 by any conventional means such as by sewn on, glued on, by adhesive tape, hook and fastening means commercially known as Velcro®, etc. The symbols 16 could be outlined with a reflective material 18. The reflective material 18 may be made of any suitable material such as cloth or tape. The reflective material 18 may be fastened to the banner 12 by any conventional means such as by being sewn, taped, glued, Velcro®, etc.

In addition, the banner 12 may contain at least one hole and preferably at least four holes in each of the corners and the holes could contain grommets 20. The grommet 20 would be capable of allowing rope to pass through it and be used as an additional method of securing the safety banner device 10 down. The grommets 20 would also allow the banner device 10 to be secured in the ground by driving stakes through the grommets. The banner 12 could also contain an area for advertisement.

FIG. 3 shows the magnet 14 may be fastened to the banner 12 by convention means of being sewn in as shown in FIG. 3. The magnet 14 shown in FIG. 3 is a commercially available magnetic disk. The magnets 14 may be sewn into place into the desired position by folding the material over and sewing the banner material 12 to form a small pocket that is larger than the magnet 14. The magnet 14 is placed inside so that the magnet 14 has a little area to move. Other known means of fastening or attaching the magnet 14 can be done such as gluing the magnet 14 to the fabric, using Velcro®, etc.

FIG. 4 is a cross-sectional view taken along the 4—4 line of FIG. 1 and shows the attachment of the grommet 20 to the banner 12. The banner 12 would have a hole where the grommet 20 would be inserted. Optionally the banner 12 would contain at least one grommet 20 and preferably four grommets 20 one at each corner of the banner 12. The grommet 20 would be capable of having rope tied through it. The banner device 10 could be used with nautical recreational apparatus such as, but not limited to boats. Floats or buoys could be attached to one end of a rope or cord. The other end of the rope or cord could be attached to the grommet 20. There should be at least two floats attached to the banner 12 at opposite ends and preferably four floats one at each of the corners enabling the banner device 10 to stay afloat in the water. If a boat got into an accident, the banner device 10 having floats attached to it would be able to be seen at night by a search party. The banner device 10 could also be attached to the boat by the magnets and also optionally tied to the boat with cord or rope through the grommets 20 if the boat became disabled.

FIG. 5 shows alternating, non-reflective strips 12, 15, and reflective strips 22 attached to said banner 12. These non-reflective strips can either be the banner material 12 or be additional non-reflective material 15 attached to said banner 12. The non-reflective strips could be a solid panel. The reflective stripes can be made of nylon but not limited to cloth or tape. The reflective strips 22 could go diagonally across the banner 12. The reflective stripes could be about 3 to about 6 inches in width, covering the complete length of the banner 12.

FIG. 6 shows a top plan view of a storage container for the safety banner shown in FIGS. 1-5. The storage container 24 would be capable of holding a folded up banner device 10 inside of it. The storage container 24 could be made of any suitable lightweight material such as nylon, cotton, etc. The material could also be a water- and/or fire-proof material. The storage container 24 can be of any size or shape. The preferable shape would be rectangular. The storage container 24 would open at the top such that the banner device 10 after being folded up, would be able to be stored in the container 24. The storage container 24 can have any fastening means 26 to close it such as Velcro®, snaps, zippers, etc.

The total weight of the storage container 24 and the safety banner device 10 would be less than about 5 pounds, preferably less than about 2 pounds and most preferably less than about 1 pound. In addition, FIG. 2 shows that advertisement may be placed on the banner 12 for companies such as by towing, insurance companies, travel agencies and/or on the storage container 24.

The banner safety device 10 has endless uses. It could be used by aircraft at an air crash site. It could be used by hikers or campers that get lost in the woods or become trapped because of weather conditions such as avalanches. It would make it much easier to find people trapped if the people had such a device and were able to place the device in an open area such that a search party could spot and find them. The device is an economical, light-weight device that could fit under a car seat or in a glove compartment. The device is easy to use for all ages.

What is claimed:

1. A safety banner device comprising:
   a) a foldable material having a perimeter;
   b) at least one warning symbol made of a reflective material and mounted on said foldable material thereby becoming visible to people when lights would shine on said banner;
   c) a plurality of magnets embedded in said foldable material along the perimeter and at least one of said magnets embedded in said foldable material within said at least one symbol thereby allowing the material to be affixed to a metal surface; and
   d) said banner is capable of being folded up several times or rolled up whereby it is capable of being stored into a small container.

2. The device as claimed in claim 1, wherein said banner has four corners and has at least four magnets, one being in each corner of said banner.

3. The device as claimed in claim 2, wherein said banner has at least three symbols.

4. The device as claimed in claim 3, wherein said symbols are triangular in shape.

5. The device as claimed in claim 4, wherein each symbol is outlined with a reflective material.

6. The device as claimed in claim 5, wherein said banner has at least four grommets, one being in each corner of said banner.

7. The device as claimed in claim 2, wherein said magnets have a top and bottom surface wherein said bottom surface of the magnet is flat and is capable for mounting the device to a metal surface.

8. The device as claimed in claim 1, wherein said foldable material comprises a material containing strips of reflective material.

9. The device as claimed in claim 8, wherein said reflective strips are made of nylon.

10. The device as claimed in claim 9, further comprising a storage case where said device is placed inside said storage case.

11. The device as claimed in claim 10, wherein said storage case and device weigh less than about 5 pounds.

12. The device as claimed in claim 11, wherein said storage case and device weight less than about 2 pounds.

13. The device as claimed in claim 11, wherein said storage case and device weigh less than about 1 pound.

14. The device as claimed in claim 6, further comprising at least one rope or cord having two ends with one end being attached to one of said grommets and the other end being capable of being attached to another object.

15. The device as claimed in claim 1, wherein said foldable material is made up of a nylon mesh.

16. A method of warning people of danger comprising placing the device as claimed in claim 15, in a visible location whereby people near said location will be capable of seeing said device.

17. The device as claimed in claim 1, further comprising a storage case wherein said device is placed inside said storage case.

18. A method of warning people of danger comprising placing the device as claimed in claim 1, in a visible location whereby people near said location will be capable of seeing said device.

19. The device as claimed in claim 1, wherein said at least one symbol is triangular in shape.

20. The device as claimed in claim 1, further comprising at least one grommet.

21. The device as claimed in claim 1, wherein said foldable material is a light-weight material weighing less than 5 pounds.

22. The device as claimed in claim 1, wherein said foldable material is a mesh material whereby when said device is placed on the rear of an automobile, the mesh allows the hazard lights to shine through said device.

* * * * *